Nov. 15, 1932.  J. S. STOKES  1,887,864
WRAPPED BOX
Filed March 22, 1930  9 Sheets-Sheet 1
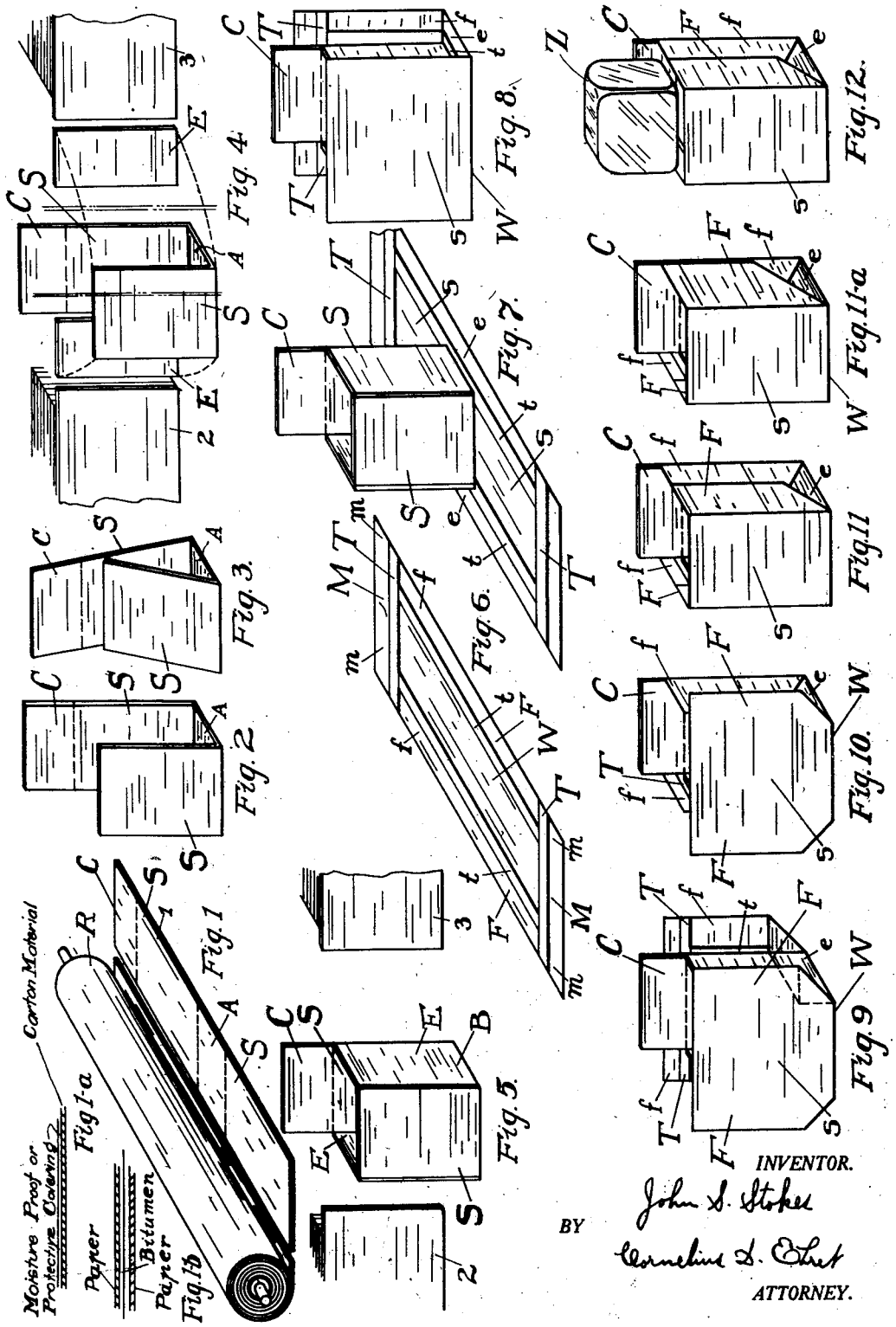

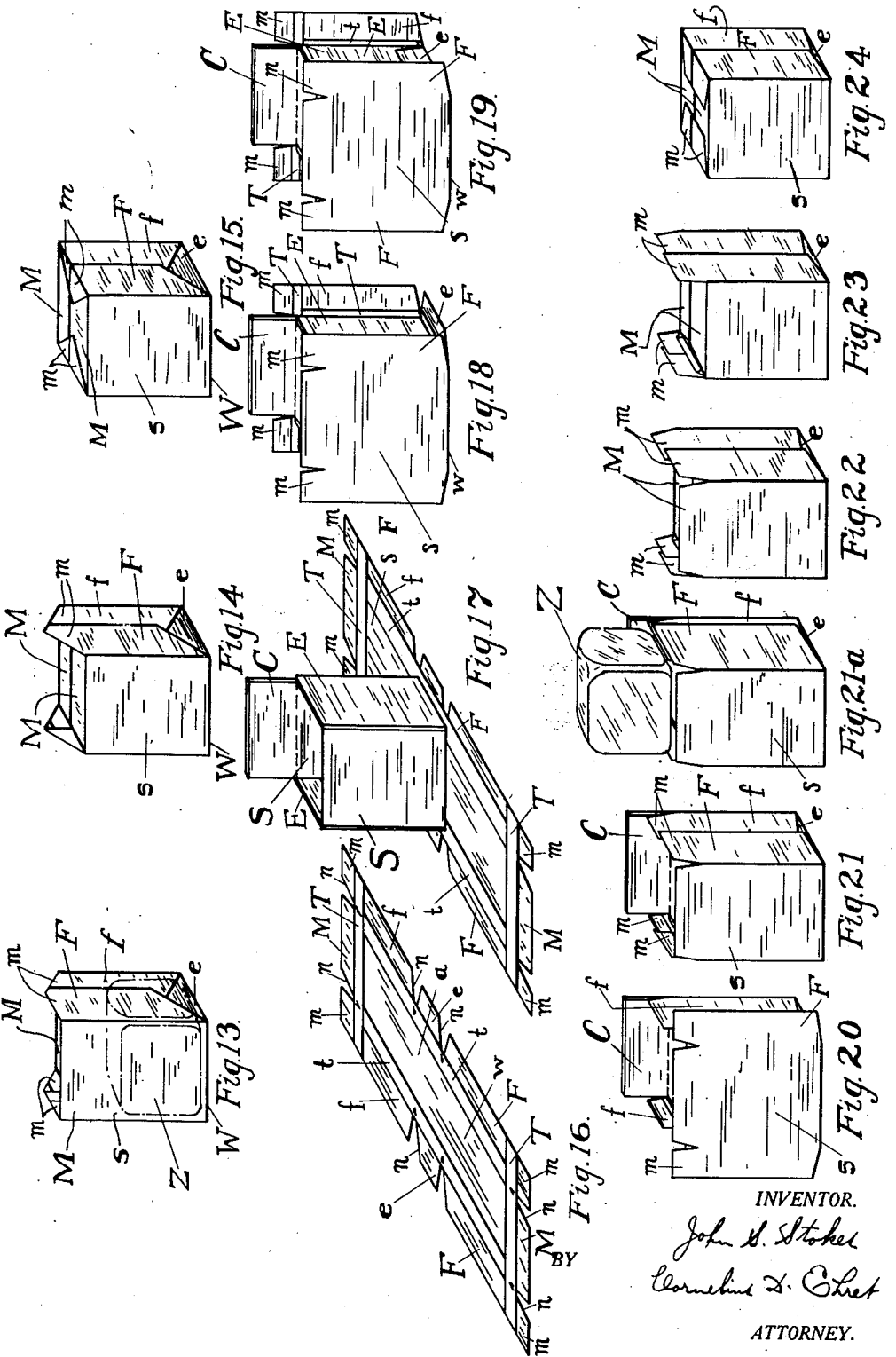

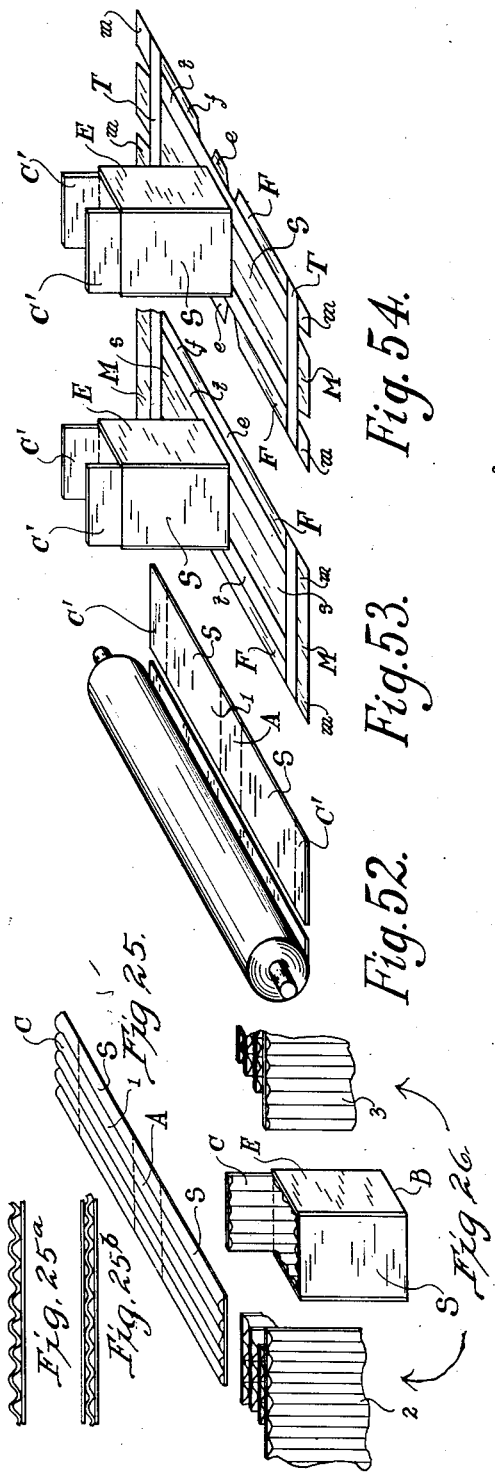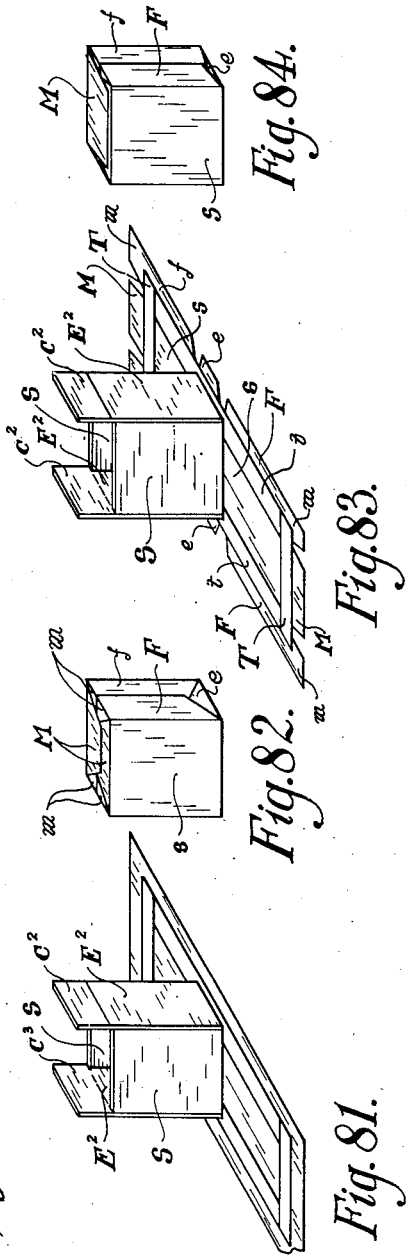

Nov. 15, 1932.                J. S. STOKES                1,887,864
                              WRAPPED BOX
                        Filed March 22, 1930        9 Sheets-Sheet 4
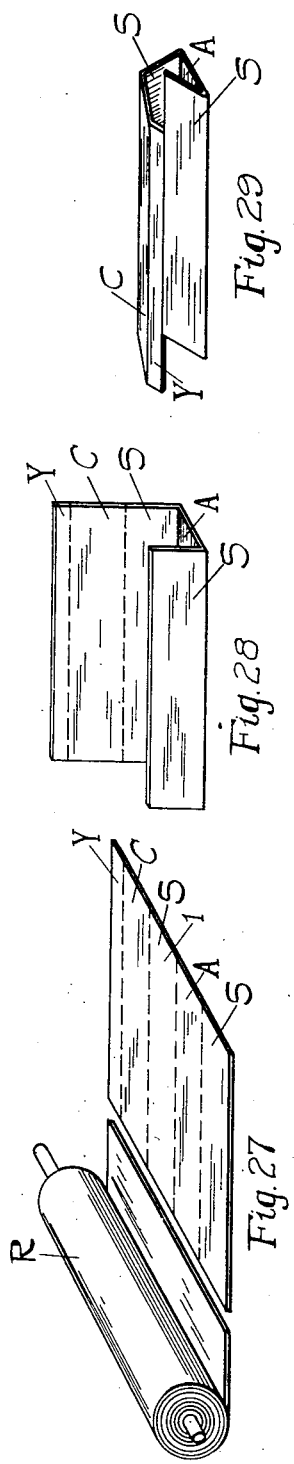
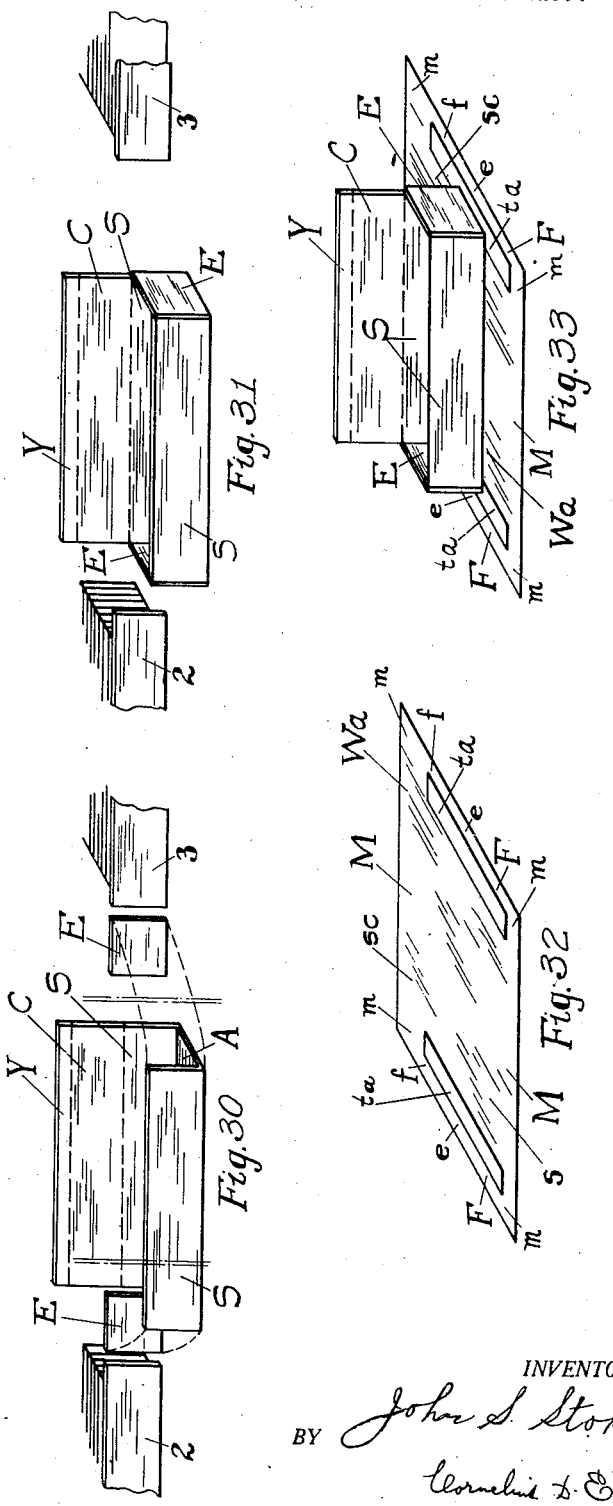
INVENTOR.
BY  John S. Stokes
    ATTORNEY.

Nov. 15, 1932.　　　J. S. STOKES　　　1,887,864
WRAPPED BOX
Filed March 22, 1930　　　9 Sheets-Sheet 5
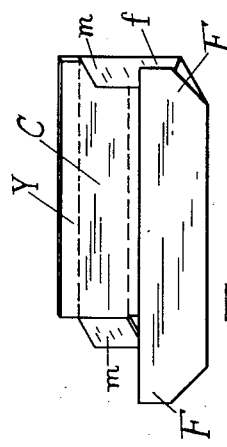
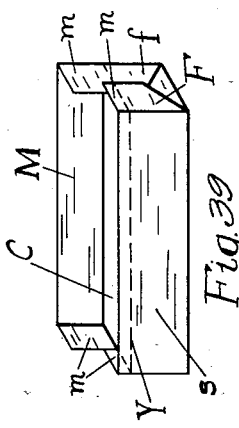
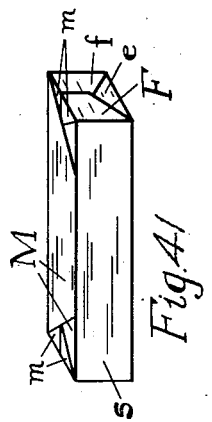
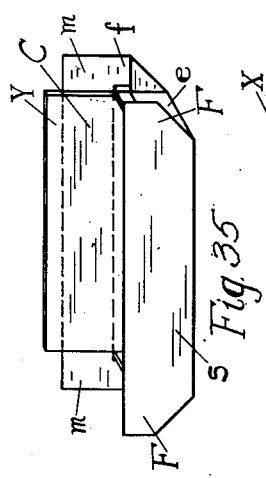
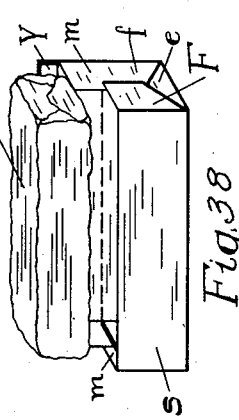
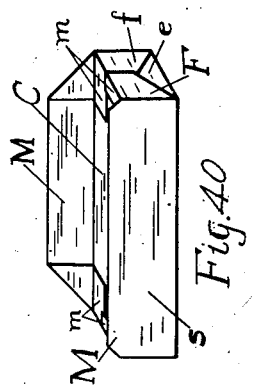
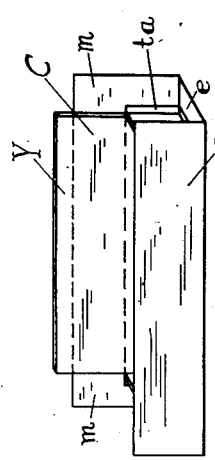
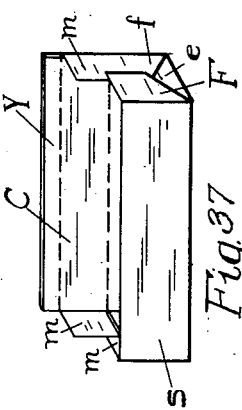
INVENTOR.
BY John S. Stokes
Cornelius D. Ehret
ATTORNEY.

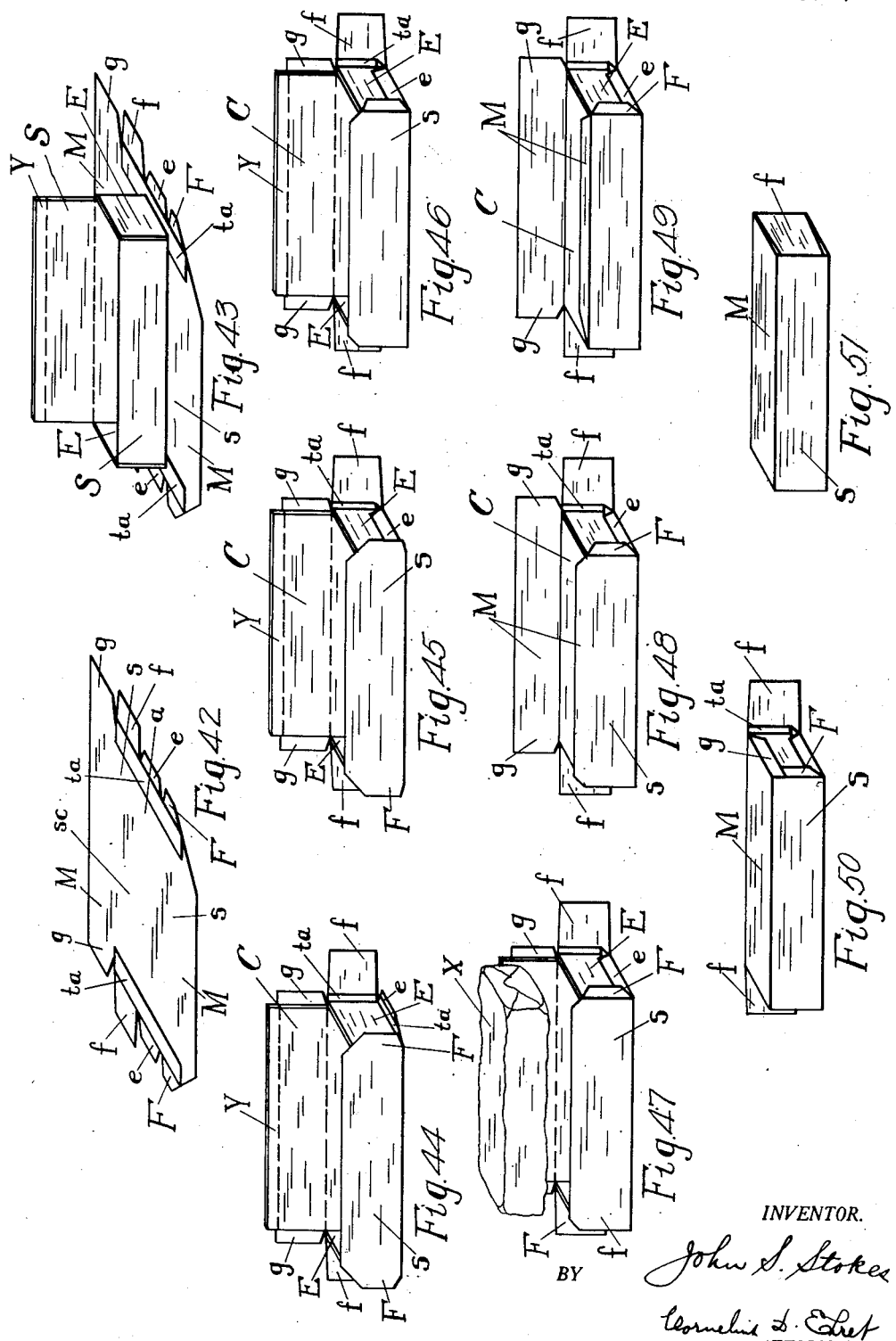

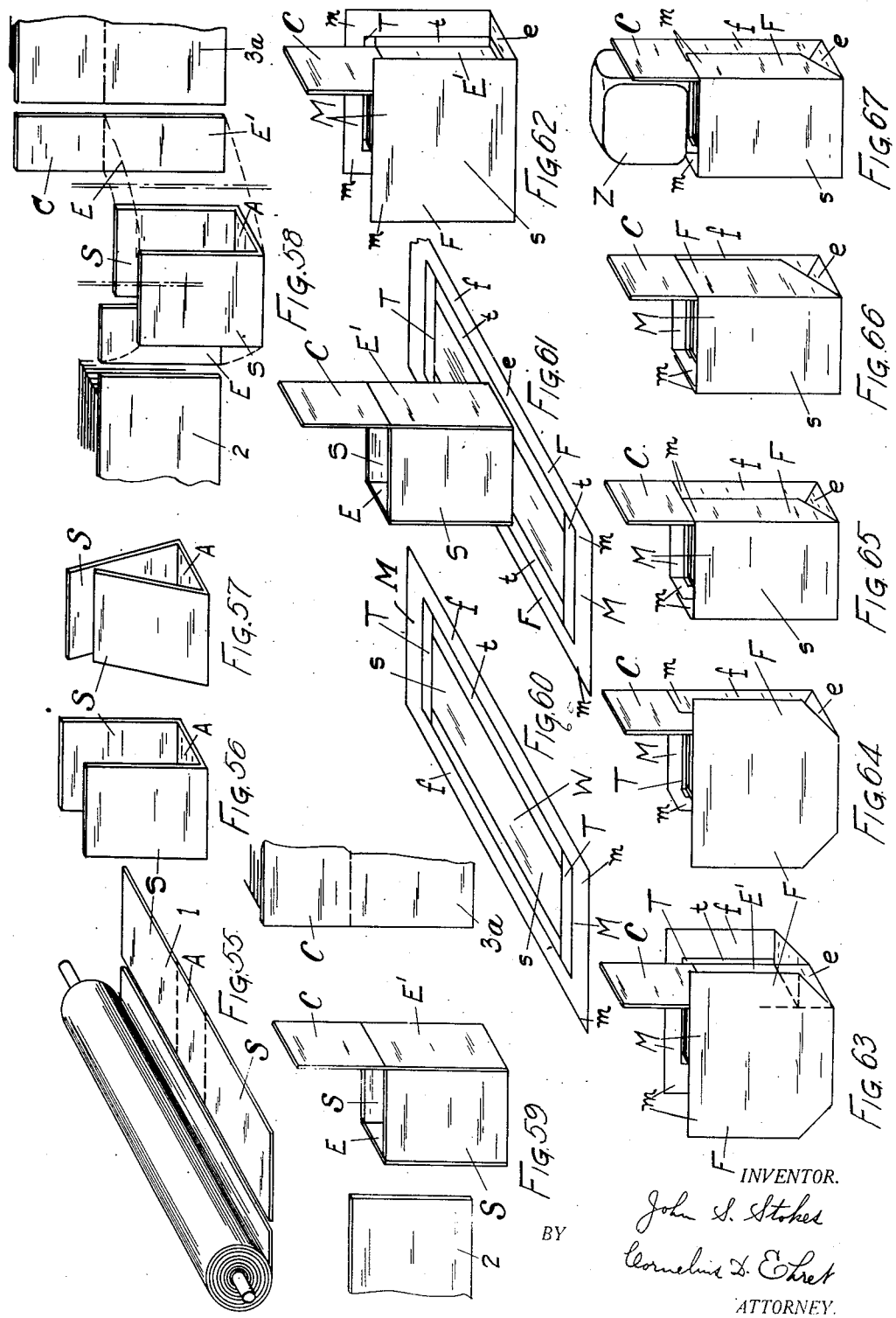

Nov. 15, 1932.   J. S. STOKES   1,887,864
WRAPPED BOX
Filed March 22, 1930   9 Sheets-Sheet 8
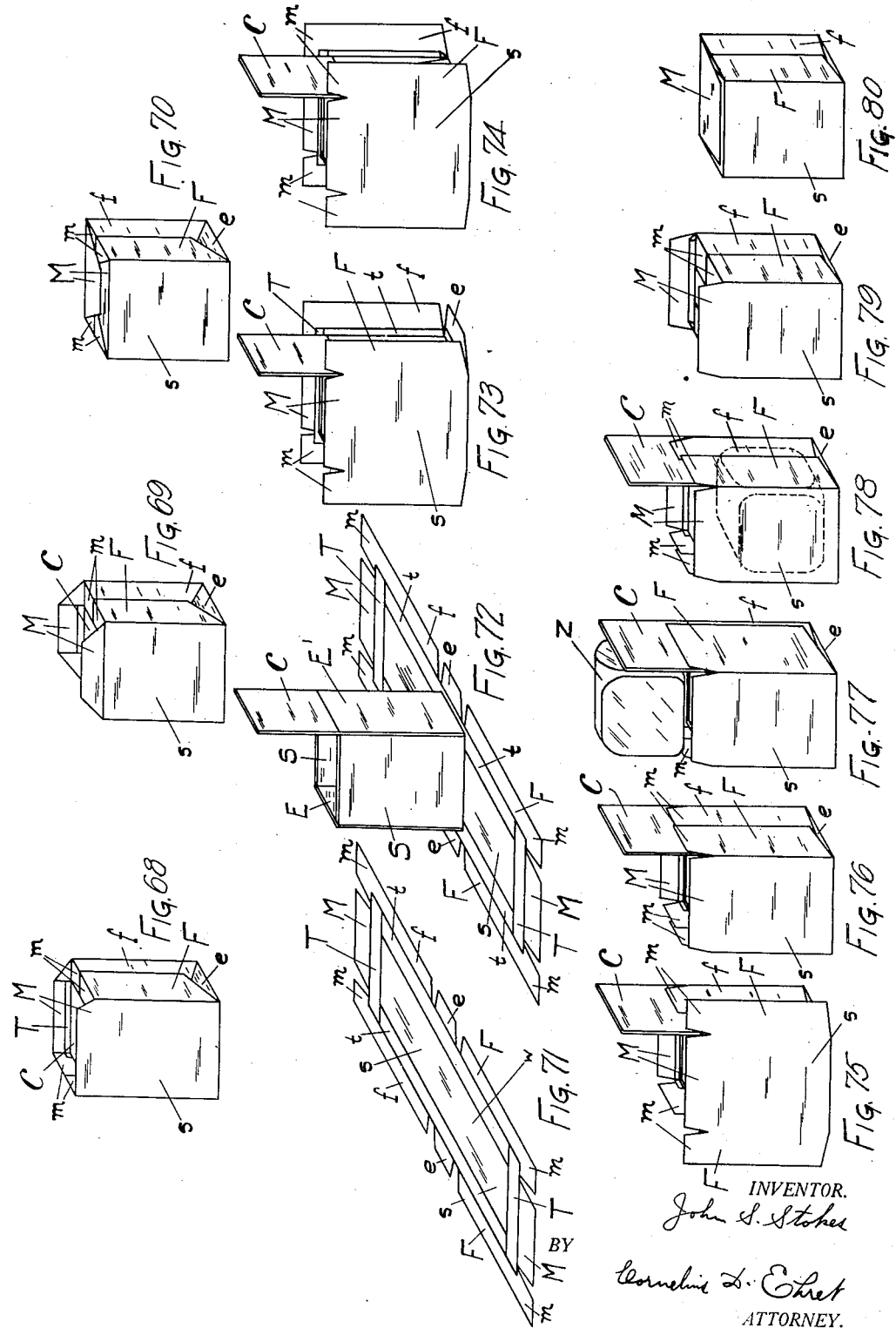
INVENTOR.
John S. Stokes
BY
Cornelius D. Ehret
ATTORNEY.

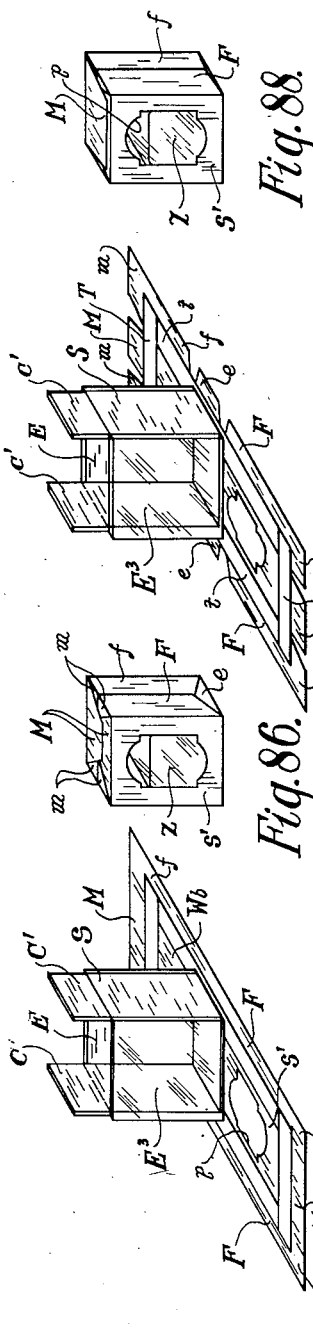
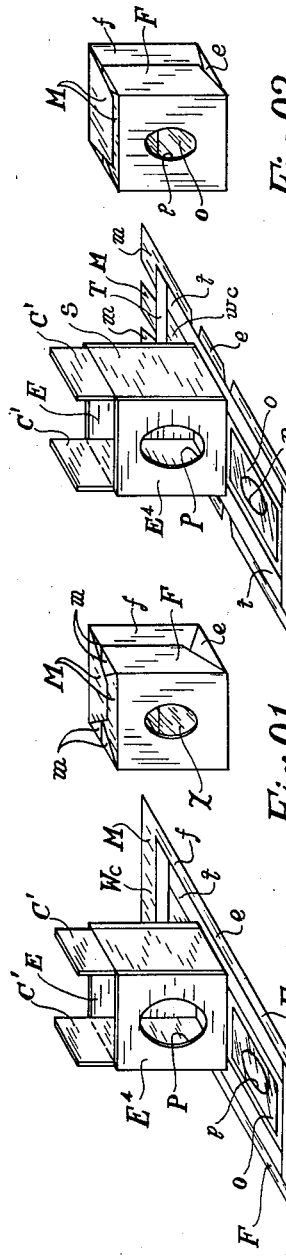

Patented Nov. 15, 1932

1,887,864

UNITED STATES PATENT OFFICE

JOHN S. STOKES, OF HUNTINGDON VALLEY, PENNSYLVANIA, ASSIGNOR TO STOKES AND SMITH COMPANY, OF SUMMERDALE, PENNSYLVANIA, A CORPORATION OF PENNSYLVANIA

WRAPPED BOX

Application filed March 22, 1930. Serial No. 438,229.

My invention relates to boxes, cartons, containers, or the like, hereinafter generically termed "boxes" comprised of a plurality of independent, separate components, sections or elements retained in box-forming position by wrappers, sheets, labels, or equivalent hereinafter generically termed "wrappers".

In accordance with my invention, all or part of the top or cover of the box is integral with or attached to a component or element forming at least one vertical wall of the box; more specifically, one of the components forms the bottom, opposite vertical walls, and the top of the box, and other components form the other vertical box walls; preferably, the top is a single panel integral with a box side wall.

Further in accordance with my invention, after the components have been assembled in box-forming position, the cover remaining open, a wrapper, preferably a one-piece cut wrapper having suitable tabbing thereon, is applied thereto. Prior to closing and covering of the cover, an article or material generically termed "box contents" is placed within the box and thereafter the cover is closed and the wrapping operation continued. If it is desired to display the contents of the closed box, at least one of the box components is of suitable transparent material and the wrapper panel engaging it is provided with a window or cut-out portion through which the contents of the closed, filled box may be viewed; or as an alternative, the box and wrapper may have registering openings, with covering of transparent material permitting visual inspection.

In another aspect of my invention but particularly in connection with a composite box of the type described, the turn-in flaps of the wrapper side panels overlap to comprise the principal covering of the end walls and are provided with tabbing so disposed that when the cover is closed and the wrapping operation completed, edges of the box formed by the top and the vertical walls are reinforced or strengthened.

The tabs may be of moisture-impervious material and as they overlie all box edges formed by non-integral elements, they seal the box to exclude moisture, and when the box elements are of moisture proof material, make possible a closed container whose contents are protected from exchange of moisture with the surrounding medium, or atmosphere.

My invention further resides in the boxes and methods of making them hereinafter described and claimed.

For illustration of some of the various forms my invention may take, reference is made to the accompanying drawings in which:

Fig. 1 in perspective, represents a roll of box material from which a box element has been cut.

Fig. 2 discloses in perspective, the box element of Fig. 1 bent to position.

Fig. 3 in perspective, discloses the element of Fig. 1 in the position assumed during a shaping operation.

Figs. 4 and 5 illustrate successive steps of forming a box comprising the component of Fig. 1.

Fig. 6 in perspective, discloses an uncut tabbed wrapper.

Figs. 7 to 11 illustrate in perspective, the successive steps of applying the wrapper of Fig. 6 to the vertical walls of the box.

Fig. 11a is similar to Fig. 11 disclosing the appearance of the box when a modified wrapper is utilized.

Figs. 12 to 15 in perspective, illustrate the successive steps of filling, closing, and completing wrapping of the box of Fig. 5.

Fig 16 discloses in perspective a cut tabbed wrapper.

Figs. 18 to 21 and 22 to 24 in perspective illustrate successive steps of applying the wrapper of Fig. 16 to the box of Fig. 5.

Fig. 21a is similar to Fig. 21 differing therefrom in that a modified form of wrapper is shown.

Fig. 25 discloses in perspective, a box element of corrugated box material.

Figs. 25a and 25b are cross-sectional views of corrugated box material.

Fig. 26 discloses in perspective, the components of a corrogated box in position for application of a wrapper.

Fig. 27 in perspective, discloses a roll of box material from which a modified form of box element has been cut.

Figs. 28 and 29 disclose the box element of Fig. 27 bent along scoring thereof.

Figs. 30 and 31 illustrate in perspective successive steps of associating other box elements with the element of Fig. 27 to form a box.

Fig. 32 illustrates in perspective an uncut tabbed wrapper.

Figs. 33 to 41 illustrate in perspective, the successive steps of applying the wrapper of Fig. 32 to the box of Fig. 31.

Fig. 42 illustrates in perspective, a tabbed cut wrapper.

Figs. 43 to 51 in perspective, disclose the successive steps of applying the wrapper of Fig. 42 to the box of Fig. 31.

Fig. 52 illustrates in perspective, a roll of box material from which a further modified form of box element has been cut.

Fig. 53, in perspective, discloses a box utilizing the component of Fig. 52 on an uncut wrapper.

Fig. 54 illustrates a box utilizing the component of Fig. 52 on a notched wrapper.

Fig. 55 discloses in perspective, a roll of box material from which another modified form of box element has been cut.

Figs. 56 to 59 illustrate in perspective, the successive steps of forming a box from the element of Fig. 55 in association with other box elements.

Fig. 60 discloses in perspective an uncut tabbed wrapper.

Figs. 61 to 70 disclose in perspective, the successive steps of applying the wrapper of Fig. 60 to the modified form of box shown in Fig. 59.

Fig. 71 illustrates in perspective, a cut tabbed wrapper.

Figs. 72 to 80 disclose the successive steps of applying the wrapper of Fig. 71 to the box of Fig. 59.

Fig. 81 shows the box components of Fig. 53 in a different position on an uncut wrapper and Fig. 82 illustrates the resulting box.

Fig. 83 shows the box components of Fig. 53 in a different position on a notched wrapper and Fig. 84 illustrates the resulting box.

Fig. 85 is similar to Fig. 81 except that one of the components is of transparent or translucent material, and that the wrapper is provided with an opening.

Fig. 86 illustrates the box formed by the box components and wrapper of Fig. 85.

Fig. 87 is similar to Fig. 85 except that the wrapper is notched.

Fig. 88 illustrates the box formed by the box components and wrapper of Fig. 87.

Fig. 89 is similar to Fig. 81 except that one of the box components is provided with an opening, and that the wrapper is provided with an opening covered by transparent or translucent material.

Fig. 90 illustrates the box formed by the box components and wrapper of Fig. 89.

Fig. 91 is similar to Fig. 89 except that the wrapper is notched.

Fig. 92 illustrates the box formed by the box components and wrapper of Fig. 91.

The roll R, Fig. 1, of suitable box material, as cardboard, box board, or the like, plain or lined on one or both sides, is a continuous strip from which box elements 1 each having a bottom panel A, side panels S, S and a cover panel C may be cut, the panels being defined by the dotted lines representing scoring which is preferably effected after the strip is removed from the roll and subsequent to or during the cutting operation. If it is desired to preserve the moisture content of the material, or articles within the completed box of any of the types herein described, the strip may be impregnated with suitable moisture-proof material or may be of a composite nature, for example, as in Fig. 1a it may be formed by a layer of paper or cardboard having on one side, which is adapted to form the inside of a box for example, a coating of wax, or as in Fig. 1b it may be formed by two layers of cardboard or the like between which there is interposed bitumen or other moisture-impervious material. The blank also may be of cardboard, or equivalent, lined or covered on one side, as Fig. 1a, with a thin sheet of cellophane, or other waterproof material.

Preferably, as each element 1 is cut from the roll, it is bent along the scoring through substantially more than 90 degrees, Fig. 3, to fracture the fibres and to insure that the vertical walls of the finished box will be flat and not bowed. The side walls S, S after this shaping operation assume the parallel position of Fig. 2 normal to the plane of the bottom panel A. The shaped box element is then preferably moved adjacent the end strips 2, 3 of stacks of strips and the box elements E, E adapted to form end walls of the box are cut therefrom and moved to the position shown in Fig. 5 to simulate a box having an open cover C. The elements E, E and blank 1 are or may be of similar material. For example, both the end elements E, E and blank 1 may be of cardboard lined, or coated, with waterproof material.

The several elements held in box forming position by suitable means or manually by an operator is registered, Fig. 7, with an uncut wrapper W, Fig. 6, having thereon tab structure t, t extending lengthwise of the wrapper, and tabs T, T extending crosswise of the wrapper. The tabs are preferably of moisture-impervious material when the box components E, E, and 1 are water-proofed as described.

The wrapper W may be removed from a stack thereof, coated with adhesive, and prior to, during, or subsequent to the coating operation have applied thereto the tab structure $t, t; T, T$. In any event the adhesive on the box-engaging faces of the tabs and wrappers, and holding the tabs to the wrapper is unset when the box assembly B Fig. 5, formed by the elements 1, E, E is registered therewith. Thereafter in either sequence but preferably simultaneously, the side panels $s, s$ of the wrapper are folded upwardly into engagement with the corresponding side panels S, S of the box B, Fig. 8. The short end sections $e, e$ of the wrapper are wiped into engagement with the corresponding elements E, E, forming the end panels of box B, Fig. 9. The turn-in flaps $f, f$ of the side panels of wrapper W in either sequence but preferably simultaneously, are wiped into engagement with the end walls of the box and with the short end panels $e$, Fig. 10, and substantially immediately thereafter the turn-in flaps F, F are bent inwardly into overlying engagement with the turn-in flaps $f$, and wrapper panels $e$ to complete the covering of the end walls of the box, Fig. 11. In some instances, as when the turn-in flaps F have printing, or decoration thereon, it is desirable that they extend substantially across the entire width of the end walls as shown in Fig. 11a.

The application of the wrapper unites the elements and holds them permanently in box-forming position after they have been released by the operator or retaining mechanism or means. Thus far, the method is generally similar to that described and claimed in my co-pending application Serial No. 88,231, filed February 15, 1926.

Without substantial delay and while all of the adhesive on the wrapper and tabs is still moist or unset, the box contents, for example, an article Z is inserted through the open top, Fig. 12, whereupon the box cover C is closed, the rear flap M moving with it, Fig. 13.

The front flap M is then folded down on the closed cover, Fig. 14, and subsequently the portions $m, m$, of the turn-in flaps, are folded to complete the box-wrapping operation, Fig. 15.

As the side panels F, F overlie the turn-in flaps $f, f$, the parts of tab structure T, T thereon overlap to reinforce the edges of the box formed by the cover C and end elements E. The other top edges of the box are reinforced by the intermediate sections of the tabs T, while the vertical edges of the box are reinforced by the end portions of the tabs $t$ whose central or intermediate portions reinforce the lower corners of the box formed by the end elements E and the bottom panel A of element 1.

The method is preferably a continuous one. Each group of elements as cut from the roll R and strips 2, 3 is moved to box-forming position and by immediately succeeding steps converted into the finished box or package of Fig. 15; furthermore several boxes may be simultaneously at different stages of completion.

A container completely excluding moisture is obtained when the blank components are covered with moisture-proof material as the moisture-proof tabs overlie and seal all edges of the container formed by the adjacent edges of the components.

While the foregoing method may be effected manually, it may, at least in part, be carried out by apparatus generally similar to that disclosed in my co-pending application Serial No. 147,405 filed November 10, 1926. The end elements E, E may be cut from rolls of box material as described and claimed in my co-pending application Serial No. 363,828, filed May 17, 1929, and fed into engagement with wrapping machine form block structure by mechanism disclosed in co-pending Rider application Serial No. 425,751, filed February 4, 1930.

Another method of producing the package of Fig. 15, may be followed by applying stay strips to the box components of Fig. 5, as along all vertical corner and along the corners formed by the ends E and the bottom A. Tab strips $t$ may be omitted from the wrapper, though preferably tabs T are retained. The steps of the wrapping operation may correspond to the foregoing description of Figs. 7 to 15.

While the adhesive has been described as applied to the wrapper immediately prior to the box-wrapping, it will be understood that the wrappers may be previously prepared and reactivated or rendered adhesive at that time or during the wrapping operation. Further, the adhesive may be of such character that it is softened by heat and unaffected by moisture, in which event, it may be rendered adhesive at any suitable time before, during or after completion of the wrapping operation, or different portions of the wrapper rendered adhesive during different steps of the wrapping operation. For example, there could be substantial lapse of time between the steps of Fig. 11 and Fig. 12, and between the steps Fig. 12 and Fig. 15.

The wrapper $w$ of Fig. 16 is a cut wrapper having the corner notches $n$, the apexes of which are bridged by the tabs T, $t$ generally as described and claimed in my co-pending application Serial No. 79,936, filed January 8, 1926, or more specifically as described and claimed in Rider application Serial No. 294,088, filed July 20, 1928. The box assembly formed by elements 1, E, E held in position to form a box B, Fig. 5, is disposed to effect engagement between the bottom panel A of the element 1 and the bottom panel of the wrapper $w$. The steps of applying the wrapper $w$ are generally similar to those of applying the uncut wrapper W. Briefly, the side panels $s$ are brought into engagement with corresponding side panels S of element 1, the short end panels e of the wrapper are turned upwardly into engagement with the elements E, E, and thereafter the side panel turn-in flaps f, f, F, F are successively in pairs folded inwardly to cover the end walls of the box formed by the elements E, and to unite the several elements into integral box structure. Adjacent end panels f, F may overlap to greater or less extent, Figs. 21 and 21a, the long overlap being more satisfactory when printing is displayed on the ends of the finished box. The assembly of the elements in box-forming position and the application of a wrapper permanently to unite them in this position may be effected at a box-wrapping station, Fig. 4, for example.

With the cover structure C in open position and before setting of any of the adhesive on the tabs or wrapper, the box contents generically represented by the article Z is inserted and the cover structure C closed, Fig. 22, the rear marginal turn-in portion M adhering to the cover moving with it. Thereafter the front marginal portion M is folded into engagement with the cover, Fig. 23. To complete the wrapping, the marginal portions m of the turn-in flaps f, F are turned inwardly into engagement with the outer surface of the closed cover, the ends of the tabs T thereon overlapping completely to reinforce a pair of the top box edges. It will be understood that as previously described, the box may be stayed prior to wrapping, and that the adhesive may be other than water-soluble, for example, it may be softened by heat. Particularly in the last instance mentioned, considerable time may elapse between at least some of the wrapping steps.

When a box of great strength is desired, as when fragile articles are to be transported, the box element 1 may be of corrugated material having either a single smooth side, Fig. 25a, or two smooth surfaces, Fig. 25b. When a box is made of the former, the smooth side should be the exterior for application of a wrapper. The ribs or corrugations should preferably extend lengthwise of the element that the scoring may be transversely thereof. The element 1 after being cut from the strip or otherwise formed is bent to position, Figs. 2 and 3, and moved adjacent stacks of strips of corrugated board, Fig. 4, from the end strips 2, 3 of which are cut box elements E, E swung into position to form a box B, Fig. 26. As the end elements E are cut, the end strips of the stacks are fed toward each other to proper extent in preparation for the next cutting operation. When an end strip is completely used, the next strip of the stack in turn becomes the end strip and the feeding and cutting continues until the stack is exhausted.

As disclosed, the corrugations of the end elements E, E extend vertically of the box, parallel to the ribs of the side wall panels S, S. The box element 1 may be supported in the position shown in Fig. 4 by wrapping machine form-block structure to which the end elements E, E are fed manually or by suitable mechanism above referred to. The wrapper W suitably coated with adhesive is transported manually or by known conveyor mechanism into the path of the form-block structure to effect registering engagement of the box B and wrapper W. Thereafter, as during descent of the form-block structure, the side panels, end panels and turn-in flaps of the wrapper are brought into engagement with the corresponding walls of the box as previously described. The appearance of the open, wrapped box being generally similar to Fig. 11 or Fig. 11a depending upon whether the turn-in flaps of the wrapper are of greater or lesser width. After removal of the form block structure, the article Z is inserted, the box cover closed and the wrapping operation completed as previously described. The wrapping operation may however, be partially or completely performed manually. This box as well as those before and hereafter described may be stayed prior to wrapping, the adhesive may be heat-softened, as during the wrapping operation, and particularly when the adhesive is heat-softened there may be intervals of substantial duration between some of the wrapping steps.

The notched wrapper of Fig. 16 may be applied to the box instead of the uncut wrapper of Fig. 6. Detailed description of the wrapping operation is not necessary in view of the discussion of Figs. 18 to 24.

Box element 1 of Fig. 28 differs from that of the preceding figures in that it is adapted for forming a long box, particularly one whose cover portion C has a depending flange Y. After scoring of the element, it is bent to assume the temporary position shown in Fig. 29 to rupture or fracture the fibres connecting the adjacent panel sections of the element. With the element 1 in the position shown in Fig. 30, end elements E cut from the end strips or stacks thereof, as previously described, are moved into box-forming position therewith. The elements temporarily retained in position are brought into registering relation with the wrapper Wa having the tabs ta thereon. The side panel s of the wrapper is folded into engagement with the front panel of the box and the panel sc of the wrapper is brought into engagement with the back of the box, Fig. 34. Subsequent thereto the end portions e of wrapper Wa are folded upwardly into engagement with end walls of the box, Fig. 35. After the turn-in flaps f, f of the panel sc are turned inwardly, the flaps F, F of panel s are folded thereover, Fig. 37. At this incomplete state of the wrapping operation, the box contents represented by the wrapped article X, are inserted through the open top. The cover C is then closed with the flange portion Y thereof inserted between the article and the inside of the front panel of the box, Fig. 39. The upstanding portions m, m of the wrapper sections in engagement with the end walls of the box are then turned downwardly into adhesive engagement with the top of the closed cover. The wrapping operation is completed by effecting engagement in succession between the upstanding portions M, M of the front panel s and of the rear panel s c, the long rear portion overlying the shorter front portion, Fig. 41. With this type of box, it is desirable to use heat-softened adhesive to avoid difficulty in closing the cover independently of the rear flap M, Fig. 39.

The cut or corner-notched wrapper of Fig. 42 may be utilized to wrap the box of Fig. 31. As shown in Fig. 43 the elements in box-forming position are so disposed that the bottom panel A of the box engages the corresponding panel a of the wrapper. Thereafter the side panels s, s, of the wrapper are brought into engagement with the front and rear panels S, S of element 1, Fig. 44. The end panels e, e of the wrapper are folded manually or by suitable mechanism into engagement with end walls E, E, the intermediate portion of the tabs ta overlying and reinforcing the lower corner of the box formed by the end elements and box panel A. After the article X is inserted through the open top, Fig. 47, the cover C is moved to closed position with the flange Y thereof between the article and the inside of the front wall of the box. The marginal portion M of the front panel s is wiped into engagement with the outer surface of the cover and thereafter the rear wide marginal panel M of the wrapper is moved into engagement with the cover preferably overlying the marginal portion M of the front wrapper panel. After the flaps g, g of the rear panel M and flaps F, F of the front panel s have been wiped into engagement with the end elements E, E, the flaps f f of panel s c are moved inwardly toward each other and into engagement with the box ends and wrapper portions e, f and g to complete wrapping of the box or package.

It is characteristic of the modifications previously described that the box top or cover structure is a continuous piece. The element 1 of Fig. 52 is so scored that the top or cover structure is formed by the two sections C', C', each of which is integral with an adjacent box portion S, adapted to form a vertical wall of a box, Fig. 53. To preclude bowing of the panels, the element is subjected to a shaping operation. Other elements E, E are brought into association with element 1 to simulate a box, Fig. 53. The wrapper of Fig. 6, is applied to the box as shown in Figs. 8 to 11.

After the article has been inserted through the open top, the cover portions C', C' of element 1 are bent downwardly and toward each other to close the box, the marginal portions M of the wrapper moving therewith, whereupon the marginal flaps m are folded thereover to form the finished article.

A cut tabbed wrapper corresponding to Fig. 16 may be applied to the box of Fig. 53 by steps corresponding to Figs. 18 to 21. After the article has been inserted, the cover structure C', C' is closed and the wrapping continued as previously described.

The box element 1 of Fig. 55 is scored to form a bottom panel A and side panels S, S. The element after being subjected to a preliminary shaping operation, Fig. 57, is brought adjacent the end strips 2, 3a of stacks thereof, Fig. 58. The element E' cut from the end strip of the latter stack is of such dimensions and scored to form an end panel E and cover structure C. The elements 1, E and E' are brought into box-forming position as shown in Fig. 59 and are permanently united by an uncut tabbed wrapper, Fig. 60, by a series of wrapping operations, which as shown by Figs. 62 to 70, correspond substantially with the box-wrapping steps previously described, in connection with the box of Fig. 5. The application of the cut or corner-notched wrapper of Fig. 72 to the box is clearly disclosed by Figs. 73 to 80.

This modification also differs from those previously described in that marginal turn-in flaps m, m directly engage and move with the cover, Fig. 67 and Fig. 68, the marginal turn-in flaps M, M overlying flap m, m and overlapping each other to effect neat appearance of the box top.

In accordance with a still further modification of my invention the cover structure is formed of two separate portions C2, C2, each integral with a respective end element, E2, E2, Fig. 81, preferably cut from strips disposed in a stack adjacent a wrapping station to which the element 1a, has been transported. The elements 1a, E2, E2 while held in box-forming position, have applied thereto either an uncut wrapper or a cut wrapper, to hold them in box-forming position. The successive steps of the box-wrapping operation correspond generally to those of Figs. 62 to 70 and Figs. 73 to 80, corresponding box and wrapper panels or sections being identified by like reference characters. This type of box is similar to that of Fig. 80, in that the portions M of the side panels overlie the marginal portions m of the turn-in flaps.

For display purposes, or other reasons, it may be desirable to expose the contents of a closed package or box. While the following description is confined to the modification of my invention generally similar to that exemplified by Figs. 53 and 54 of which it is characteristic that the cover structure is divided into two portions, each forming the extremity of a box element, it will be understood that any of the other modifications may be utilized. The element E, Fig. 85, is of ordinary box material while the element E3 is of more or less transparent material as mica, cellophane or the like. The wrapper Wb, is generally similar to the wrapper W of Fig. 6 differing therefrom in that one of the side panels sl is provided with an opening or cut-out p. During the wrapping operation, the wrapper panel sl is brought into engagement with the transparent element E3 to provide an opening or window through which the box contents or article Z may be viewed after insertion, and after the box has been completely wrapped, Fig. 86. As the wrapping operation does not differ from those previously discussed, the steps are not described in detail.

The wrapper wb of Fig. 87 is similar to the corner-notched wrapper w of Fig. 16 differing therefrom in that the side panel s' adapted to engage the transparent panel E3, is provided with an opening or cut-out p through which the box contents may be viewed as previously explained. As the application of the wrapper does not differ materially from the preceding description, the successive steps are not described in detail.

Aside from the matter of transparent wall, this modification of my invention differs from the modification of Figs. 53 to 54 in that the element 1 forms the bottom, ends and split cover structure of the box.

A modified form of display package may be formed by providing one of the end components E4, Fig. 89 with an opening P. This opening or the window p, of the wrapper Wc may be covered with a strip o of any suitable material, as cellophane. During a wrapping operation, the openings are brought into registering relation with the transparent strip between them, Fig. 90. The method of forming and wrapping the box is clear from the preceding description and need not be repeated.

Figs. 91 and 92 illustrate the initial and final steps of applying a cut wrapper wc to form a further modification of a display package.

While I have described several forms of my invention, it will be understood that other variations are within the scope of my invention and as expressed by the appended claims.

What I claim is:

1. The method of forming a closed box from a plurality of separate box-forming elements, one of which is adapted to form cover structure and adjacent wall structure, which comprises moving the elements to box-forming position with the cover structure in open position, applying a wrapper to the elements to hold them in said box-forming position, inserting the box contents through the open top, and thereafter closing the cover and completing the wrapping of the box.

2. The method of forming a closed box from a plurality of separate box-forming elements, one of which is adapted to form at least the cover and an adjacent wall of the box, which comprises moving the elements to box-forming position with the cover in open position, applying a wrapper to the elements to hold them in box-forming position, inserting the box contents through the open top, and thereafter moving the cover to closed position and applying the wrapper thereto.

3. The method of forming a closed box from a plurality of separate box-forming elements, one of which is adapted to form at least cover structure and a side wall, which comprises moving the elements to box-forming position with the cover structure in open position, applying a wrapper to said side wall formed by said one element and to other elements to hold them in box-forming position, inserting the box contents through the open top, and thereafter moving the cover structure to closed position and applying the wrapper thereto.

4. The method of forming a closed box from a plurality of separate box-forming elements, one of which is adapted to form at least the cover and a side wall of the box, which comprises moving the elements to box-forming position with the cover in open position, applying a wrapper to said side wall formed by said one element and to other elements to hold them in box-forming position, inserting the box contents through the open top, and thereafter moving the cover to closed position and applying the wrapper thereto.

5. The method of forming a closed box from an element adapted to form the bottom, top and a pair of walls and separate elements adapted to form another pair of box walls, which comprises moving said elements to box-forming position, applying a wrapper to the bottom, side and end walls of the box, inserting the box contents, and thereafter moving the cover to closed position and applying the wrapper thereto.

6. The method of forming a closed box from a plurality of separate box-forming elements, one of which is adapted to form cover structure and adjacent wall structure, which comprises moving the elements to box-forming position, with the cover structure in open position, applying a wrapper having moist adhesive thereon to the elements to hold them in box-forming position, and before setting of the adhesive the steps of inserting the box contents through the open top, moving the cover structure to closed position, and applying the wrapper to the closed cover.

7. The method of forming a closed box from a plurality of separate box-forming elements, one of which is adapted to form at least the cover and an adjacent wall of the box, which comprises moving the elements to box-forming position with the cover structure in open position, applying a wrapper having moist adhesive thereon to the elements to hold them in box-forming position, and before setting of the adhesive the steps of inserting the box contents through the open top, moving the cover structure to closed position, and applying the wrapper to the closed cover.

8. The method of forming a closed box from a plurality of separate box-forming elements, one of which is adapted to form at least cover structure and a side wall, which comprises moving the elements to box-forming position with the cover structure in open position, applying a wrapper having moist adhesive thereon to said side wall formed by said one element and to other elements to hold them in box-forming position, and thereafter, before setting of the adhesive, the successive steps of inserting the box contents through the open top, moving the cover structure to closed position, and applying the wrapper thereto.

9. The method of forming a closed box from a plurality of separate box-forming elements, one of which is adapted to form at least the cover and a side wall of the box, which comprises moving the elements to box-forming position with the cover in open position, applying a wrapper having moist adhesive thereon to said side wall formed by said one element and to other elements to hold them in box-forming position, and thereafter, before setting of the adhesive, the successive steps of inserting the box contents through the open top, moving the cover to closed position, and applying the wrapper thereto.

10. The method of forming a closed box from an element adapted to form the bottom, top and a pair of walls, and separate elements adapted to form another pair of box walls, which comprises moving said elements to position to form a box with the top in open position, applying a wrapper having moist adhesive thereon to the bottom, side and end walls of the box, and thereafter, before setting of the adhesive, the successive steps of inserting the box contents through the open top, moving the top to closed position, and applying the wrapper thereto.

11. The method of forming a closed box which comprises cutting a box element from a strip of box material, bending the element to form at least a box top and an adjacent wall, moving said element and other elements to position to form a box with the top in open position, applying a wrapper to said elements to hold them in box-forming position, inserting the box contents through the open top, and thereafter moving the top to closed position and completing the wrapping of the box.

12. The method of forming a closed box which comprises cutting a box element from a strip of box material, bending the element to form at least a box top and a side wall, cutting end wall box elements from strips of box material, moving said elements to form a box, applying a wrapper to said elements to hold them in box-forming position, inserting the box contents, and thereafter moving the top to closed position and completing the wrapping of the box.

13. The method of forming a closed box from a plurality of separate box-forming elements, one of which is adapted to form cover structure and an adjacent wall, which comprises moving said one element to a wrapping station, at said station moving other elements into relation with said one element to form a box with the cover structure in open position, applying an adhesive-coated wrapper to said elements to hold them in said position, inserting the box contents, and thereafter closing the cover structure and completing the wrapping of the box.

14. The method of forming a closed box from a plurality of separate box-forming elements, one of which is adapted to form cover structure and an adjacent wall, which comprises moving said one element to a wrapping station, at said station moving other elements into relation with said one element to form a box with the cover structure in open position, applying an adhesive-coated wrapper to said elements to hold them in said position, moving the box from said position and before substantial setting of the adhesive, the steps of inserting the box contents, closing the cover structure and completing the wrapping of the box.

15. The method of forming a closed box which comprises cutting a box element from a strip of box material, bending the element to form at least a box top and an adjacent wall, moving said element to a wrapping station; at said station moving other elements into box-forming relation with said first element and applying an adhesive wrapper to hold the elements in box-forming position; moving the partially wrapped box from said position, inserting the box contents, closing the cover, and completing the wrapping operation by applying the wrapper thereto.

16. The method of forming a closed box from a plurality of separate box-forming elements which comprises cutting the elements at a wrapping station in box-forming position with the top in open position, applying an adhesive coated wrapper to the box with the exception of the top, and before setting of the adhesive inserting the box contents, closing the top, and completing the box-wrapping operation.

17. The continuous method of forming closed boxes which comprises cutting box-forming elements from continuous strips of box material, assembling the successive groups of elements as cut to form boxes with the tops in open position, coating wrappers in succession with adhesive, applying the wrappers in succession to groups of elements in box-forming position, filling the boxes in succession, and before setting of the adhesive and in succession closing the tops of the boxes and applying the coated wrappers thereto.

18. The method of forming a closed box which comprises applying a tabbed wrapper to a box with the turn-in flaps of opposite side panels and tabbing thereon overlapping, closing the box cover, and completing the wrapping operation to effect reinforcing of the corners of the box formed by the cover and box end walls by said overlapping tabbing.

19. The method of forming a closed box from a plurality of separate box-forming elements, one of which is adapted to form at least cover structure and adjacent wall structure of the box, which comprises moving the elements to box-forming position with the cover structure in open position, applying a tabbed wrapper to said elements with the tabbing overlying the vertical corners of the box formed thereby, inserting the box contents, thereafter moving the cover structure to closed position, and by completion of the wrapping operation reinforcing the top edges of the box formed by said cover by other tabbing of the wrapper.

20. The method of forming a closed box from a plurality of separate box-forming elements, one of which is adapted to form at least cover structure and adjacent wall structure, which comprises moving the elements to box-forming position with the cover structure in open position, applying a tabbed wrapper having moist adhesive on the box-engaging faces of the wrapper and tabs and between the tab structure and wrapper to said elements in box-forming with tab structure overlying and reinforcing the vertical corners, and before setting of any of the adhesive, the steps of inserting the box contents, moving the cover structure to closed position, and by completion of the wrapping operation reinforcing the top edges of the box formed by said cover by tab structure of the wrapper.

21. A closed box comprising an element forming the bottom and two vertical walls of the box, separate elements forming other vertical walls, cover structure integral with at least one of said elements, and a wrapper retaining said elements in box-forming position and the cover structure in closed position.

22. A closed box comprising an element forming the bottom and two side walls, separate elements forming the end walls, cover structure integral with at least one side wall, and a wrapper retaining said elements in box-forming position and uniting the cover structure to the end walls.

23. A closed box comprising an element forming the bottom and two side walls, separate elements forming the end walls, a cover integral with one of said side walls, and a wrapper retaining said elements in box-forming position and said cover in closed position.

24. A closed box comprising an element forming the bottom and two vertical walls of the box, separate elements forming other vertical walls, cover structure integral with at least one of said elements, and a tabbed wrapper retaining said elements in box-forming position and the cover structure in closed position, the tab structure thereof overlying the top horizontal corners of the box.

25. A closed box comprising an element forming the bottom and two vertical walls of the box, separate elements forming other vertical walls, cover structure integral with at least one of said elements, and a tabbed wrapper retaining said elements in box-forming position and the cover structure in closed position, the tab structure thereof overlying the top horizontal and vertical corners of the box.

26. A closed box comprising an element forming the bottom and two side walls, separate elements forming the end walls, a cover integral with one of said side walls, and a tabbed wrapper retaining said elements in box-forming position and said cover in closed position, the tab structure thereof overlying at least the corners of said box formed by junction of said cover with the end walls and the other of said side walls.

27. A closed box comprising an element of moisture-proof material forming the bottom and two vertical walls of the box, separate elements of moisture-proof material forming other vertical walls, cover structure integral with at least one of said elements, and a tabbed wrapper retaining said elements in box-forming position and the cover structure in closed position, the tab structure of moisture-proof material overlying and sealing edges of the box.

28. A closed box comprising an element forming the bottom and two vertical walls of the box, separate elements forming other vertical walls, at least one of which is of transparent material, and a wrapper completely covering said closed box and holding said elements in box-forming position having an opening to make visible the contents of the closed box through said transparent element.

29. A closed box comprising an element forming the bottom and two vertical walls of the box, separate elements forming other vertical walls, cover structure integral with at least one of said elements, and a wrapper having panels covering the bottom and a pair of sides of the box and overlapping portions covering the top and the other pair of box sides.

30. A closed box comprising an element forming the bottom and two vertical walls of the box, separate elements forming other vertical walls, cover structure integral with end wall structure, and a wrapper having panels covering the bottom and side walls of the box and overlapping portions covering the end walls and box cover structure.

31. A closed box comprising an element forming the bottom, end walls and cover of the box, separate elements forming the side walls of the box, and a wrapper having panels engaging said separate elements and the bottom and overlapping portions covering the end walls and cover of the box.

32. A closed box having a wall with an opening therein a wrapper covering said box and having an opening in register with said box opening, and a strip of transparent material between the box-engaging surface of the wrapper and the wrapper-engaging surface of the box and extending across said openings.

33. The method of forming a display box from a plurality of separate box-forming elements at least one of which is of transparent material, and a wrapper having a panel with at least one opening, which comprises applying the wrapper to hold said separate elements in box-forming position and with said panel engaging said transparent element.

34. The method of forming a display box from a plurality of separate box-forming elements, at least one of which is provided with an opening, a wrapper having a panel with an opening, and transparent strip-material, which comprises assembling the box-components in box-forming position, applying the wrapper to hold said elements in box-forming position with the wrapper opening in alignment with said opening in one of said box elements, and concurrently with application of said wrapper panel to said one element effecting interposition of said transparent material between said panel and said element to extend across said openings.

JOHN S. STOKES.